United States Patent [19]
Gardos et al.

[11] Patent Number: 5,996,008
[45] Date of Patent: *Nov. 30, 1999

[54] METHOD AND APPARATUS FOR PROVIDING STILL IMAGES IN A FULL MOTION VIDEO COMMUNICATION SESSION USING THE SAME FULL MOTION VIDEO COMMUNICATION PROTOCOL

[75] Inventors: Thomas R. Gardos, Portland; Michael J. Gutmann, Hillsboro; C. Chris Hansen; Stephen S. Ing, both of Aloha, all of Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/723,573

[22] Filed: Sep. 30, 1996

[51] Int. Cl.$^6$ ..................................................... H04N 7/10
[52] U.S. Cl. .............................. 709/219; 345/328; 348/24
[58] Field of Search ................................ 348/21, 24, 12, 348/13, 7, 390; 345/327, 328; 709/217–219; 395/200.47–200.49; 358/426, 428, 452

[56] References Cited

U.S. PATENT DOCUMENTS

| 4,654,484 | 3/1987 | Reiffel et al. | 348/6 |
| 4,870,497 | 9/1989 | Chamzas et al. | 358/426 |
| 5,426,513 | 6/1995 | Scorse et al. | 358/433 |

OTHER PUBLICATIONS

CCITT Recommendation T.81; "Terminal Equipment and Protocols for TelematicServices"; (Sep. 1992).
ITU–T Recommendation H.261; "Line Transmission of Non–Telephone Signals"; (Mar. 1993).
ITU–T Recommendation H.324; "Series H: Transmission of Non–Telephone Signals—Infrastructure of audiovisual services—Systems and terminal equipment for audiovisual services"; (Mar. 1996).
ITU–T Recommendation H.263; "Transmission of Non–Telephone Signals"; (Mar. 1996).

*Primary Examiner*—Victor R. Kostak
*Attorney, Agent, or Firm*—Blakely, Sokoloff, Taylor & Zafman LLP

[57] ABSTRACT

An apparatus is programmed with a video service for facilitating video communication with another remote apparatus, in accordance with a video communication protocol. The video service includes a still image function with logic for providing a plurality of progressive scans of one or more still images to the remote apparatus, in accordance with a still image communication protocol defined within the video communication protocol. In one embodiment, the still image function includes logic for instructing a local video capture driver to switch to a format of the still image function's choice for capturing video image frames, holding constant video image input to a video codec to generate the plurality of progressive scans of the still images, and implementing the still image communication protocol.

31 Claims, 8 Drawing Sheets

| WORD 1 | WORD 2 | WORD 3 | WORD 4 | WORD 5 |
|---|---|---|---|---|
| MESSAGE IDENTIFIER | CONSTANT 1 | CONSTANT 2 | REVERSE VIDEO CHANNEL # | PARAM 1 | PARAM 2 |

128 → MESSAGE FIELDS 142
130, 132, 134, 136, 138, 140

Fig. 6

| STILL IMAGE PROTOCOL MESSAGE | PARAM 1 | PARAM 2 |
|---|---|---|
| SIS CAMERA BUSY | CUST_PDU_STILL_QUERY | STILL_REMOTE_CAMERA_BUSY |
| SIS SETUP | CUST_PDU_STILL_QUERY | STILL_BEGIN_SESSION |
| SIS SETUP ACCEPT | CUST_PDU_STILL_QUERY_RESP | STILL_SESSION_ACCEPTED |
| SIS SETUP REJECT | CUST_PDU_STILL_QUERY_RESP | STILL_SESSION_REJECTED |
| SIT QUERY | CUST_PDU_STILL_QUERY | |
| SIT RESPONSE 1 | CUST_PDU_STILL_QUERY_RESP | STILL_FRAME_ACCEPTED |
| SIT RESPONSE 2 | CUST_PDU_STILL_QUERY_RESP | STILL_FRAME_REJECTED |
| SIT RESPONSE 3 | CUST_PDU_STILL_QUERY_RESP | STILL_FRAME_REJECTED_ALBUM_FULL |
| SIS STOP RECEIVING | CUST_PDU_STILL_ABORT_RECEIVING | 0 |
| SIS STOP SENDING | CUST_PDU_STILL_ABORT_SENDING | 0 |

Fig. 7

| PARAMETER FIELD CODING | CODING (32BITS) |
|---|---|
| RESERVED | 00000000 |
| CUST_PDU_STILL_QUERY | 00000001 |
| CUST_PDU_STILL_QUERY_RESP | 00000002 |
| CUST_PDU_STILL_STOP_SENDING | 00000003 |
| CUST_PDU_STILL_STOP_RECEIVING | 00000004 |
| RESERVED | 00000005 |
| RESERVED | 00000006 |
| CUST_PDU_STILL_ABORT_RECEIVING | 00000007 |
| CUST_PDU_STILL_ABORT_SENDING | 00000008 |
| RESERVED | 00000009 |
| | |
| STILL_BEGIN_SESSION | 00000000 |
| STILL_INCOMING_QUERY | 00000001 |
| STILL_REMOTE_CAMERA_BUSY | 00000002 |
| | |
| STILL_SESSION_ACCEPTED | 00000000 |
| STILL_SESSION_REJECTED | 00000001 |
| STILL_FRAME_REJECTED | 00000002 |
| STILL_FRAME_REJECTED_ALBUM_FULL | 00000003 |
| STILL_FRAME_ACCEPTED | 00000004 |
| | |

METHOD AND APPARATUS FOR PROVIDING STILL IMAGES IN A FULL MOTION VIDEO COMMUNICATION SESSION USING THE SAME FULL MOTION VIDEO COMMUNICATION PROTOCOL

BACKGROUND OF THE INVENTION

1. Field of the Invention

The present invention relates to the field of digital imaging. More specifically, the present invention relates to the generation and provision of still images.

2. Background Information

In recent years, continuing advances in computing and communication technology have dramatically improved the affordability of high performance computing/communication devices. Increasingly, these relatively low cost high performance computing/communication devices are being used to conduct video communication, e.g. video telephony. Typically, the video communication are conducted over a low bit rate connection, e.g. a standard telephone connection. Due to the bandwidth constraints of the low bit rate connection, the video images exchanged between the communication endpoints are not of the highest quality. Reference is made to International Telecommunication Union - Telecommunication Standardization Section (ITU-T) Recommendation H.324, entitled "Terminal for low bit rate multimedia communication" (currently in draft form).

Nevertheless, quite often, a participant to a video communication will find it desirable to take a snap shot of the remote video images, i.e. to obtain a still image. Under the prior art, because the remote video images received are not of the highest quality, the snap shot or the still image obtained will not be of the highest quality either[1]. Such snap shots are especially inferior, when compared with still images generated and sent in accordance with any one of a number of still image techniques or standards known in the art. Typically, these higher quality still images are generated using specialized image generation software, and exchanged over a data link between the communication devices. Reference is made to the ITU-T Recommendation T.81, entitled "Information technology—Digital compression and coding of continuous-tone still images—Requirements and guidelines", and Recommendation T.84, entitled "Information technology—Digital compression and coding of continuous-tone still images—Extensions".

[1]Note that it is the recipient of the remote video images who is taking the snap shots or generating the still images.

Thus, under the prior art, if high quality snap shots or still images are desired, the video communication must be conducted over a much higher bit rate connection to facilitate the provision of better video images, which means high speed connections such as T1 or Integrated Service Digital Network (ISDN) lines, as standard telephone connections are unable to meet the high bandwidth requirement, or in the alternative, separate image generation software and data link, in addition to the video communication software and video link, must be employed.

Therefore, it is desirable to have a more efficient and effective way for generating high quality "snap shots" of video images.

SUMMARY OF THE INVENTION

In view of the limitations of the prior art, and the above described desire results, an apparatus is programmed with a video service for facilitating video communication with another remote apparatus, in accordance with a video communication protocol. The video service includes a still image function with logic for providing a plurality of progressive scans of one or more still images to the remote apparatus, in accordance with a still image communication protocol defined within the video communication protocol. In one embodiment, the progressive scans are provided through the same video channel.

In one embodiment, the still image function includes logic for notifying a local video application and the remote apparatus that a video input device for supplying video images for the video communication has entered a busy state, notifying the remote apparatus to be prepared to accept the progressive scans of the still images, instructing a local video capture driver to switch to a format of the still image function's choice for capturing local video image frames, holding constant video image input to a video codec to generate the progressive scans of the still images, querying the remote apparatus, receiving response from the remote apparatus, facilitating transmission of the progressive scans of the still images to the remote apparatus, and terminating the provision on its own initiative or in response to a termination notification from the remote apparatus. In one embodiment, the local video capture driver is instructed to switch from a rectangular format to a square format.

In one embodiment, the still image function further includes logic for responding to a notification from a remote apparatus to be prepared to accept the progressive scans of the still images, instructing a local video capture driver to switch to a format of the still image function's choice for capturing remote video image frames, accepting the progressive scans of the still images to the remote apparatus, and notifying the remote apparatus to terminate the provision, or responding to a termination notification from the remote apparatus. In one embodiment, the local video capture driver is instructed to switch from a rectangular format to a square format.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, the order of presentation.

Figure 1:
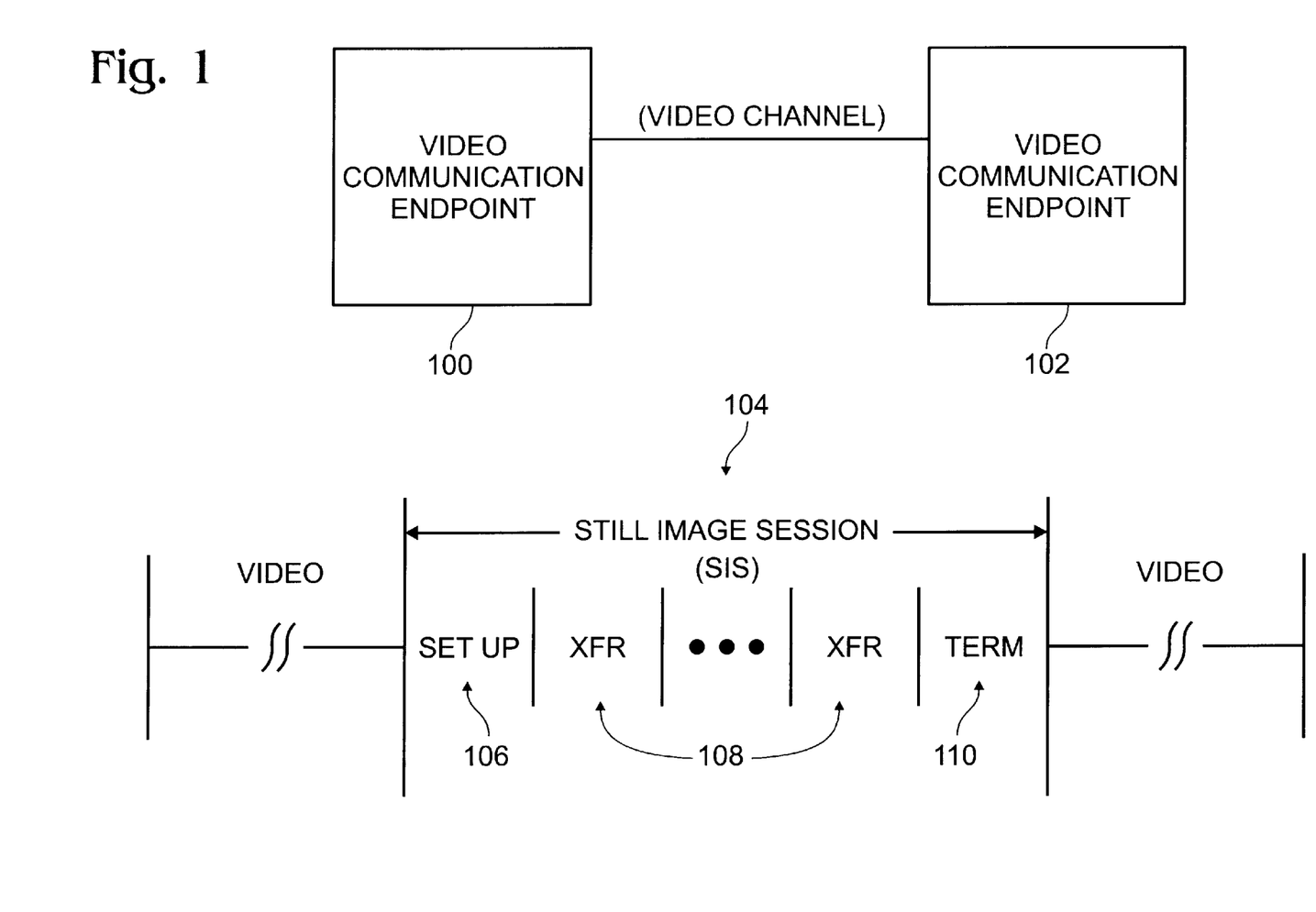
FIG. 1 is a system view of one embodiment of the present invention.

Referring now to FIG. 1, wherein a system view of one embodiment of the present invention is illustrated. As shown, video communication endpoint 100 is communicatively coupled to video communication endpoint 102, and conducting video communication in accordance with a video communication protocol. In one embodiment, video communication endpoints 100 and 102 are communicatively coupled to each other through a standard telephone connection, in other words, through a public switching telephone network (PSTN). However, in other embodiments, video communication endpoints 100 and 102 may be communicatively coupled to each other through a variety of other connections, including but not limited a T1 connection, an ISDN connection, and so forth.

In one embodiment, the video communication being conducted is video telephony, in accordance with the communication protocol specified in ITU-T Recommendation H.324. However, in other embodiments, the present invention may be practiced with other forms of video communication, using other extensible video communication protocols.

As illustrated in FIG. 1, and will be described in more detail below, in the course of the video communication, either endpoint 100 or 102 may initiate temporary suspension of the video communication in progress, enter a still image session (SIS) 104 to provide the other endpoint 102 or 100 with a plurality of progressive scans of one or more still images, in accordance with a still image combination protocol that is defined within the video communication protocol being employed, and then resume the temporarily suspended video communication. In one embodiment, the progressive scans are provided through the same video channel.

For the illustrated embodiment, a still image session 104 includes a still image set up subsession 106, zero[2] or more still image transfer subsessions 108, and a still image termination subsession 110. Each of these subsessions 106–110 is conducted with still image message packets, in accordance with the still image communication protocol of the present invention, defined within the video communication protocol.

[2]There are no SIS transfuser subsessions if the receiver rejects the sender's "offer" to provide the progressive scans of the still images.

Figure 2:
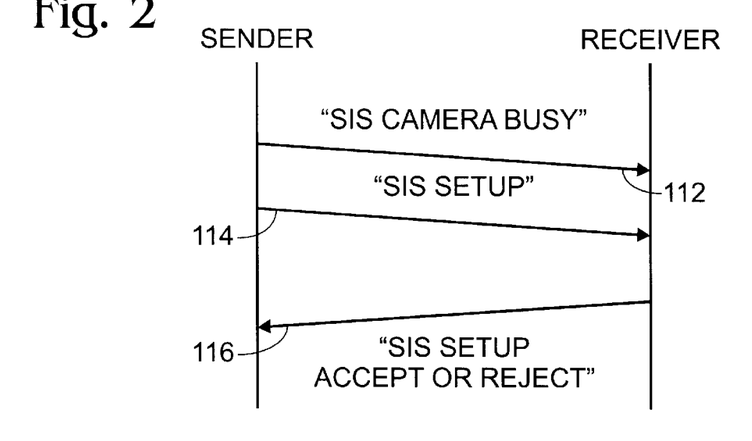
FIGS. 2–4 illustrate one embodiment of a still image communication protocol for conducting the still image session of FIG. 1.
Figure 3:
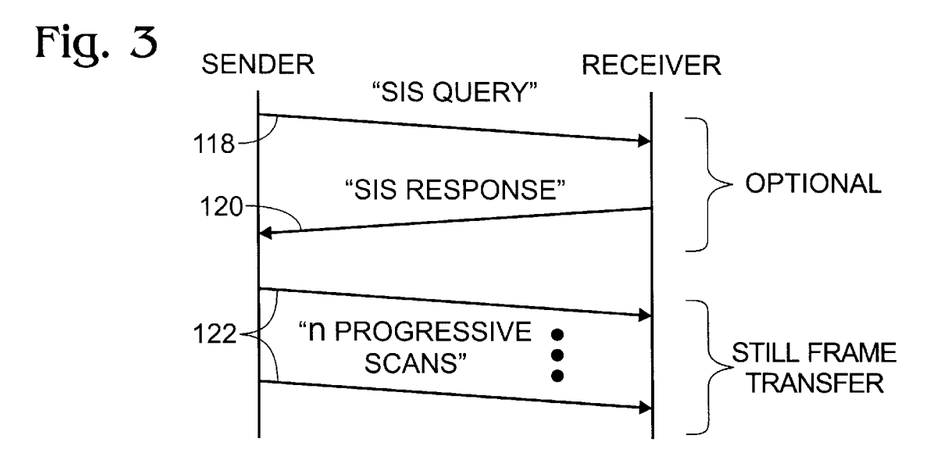
Figure 4:
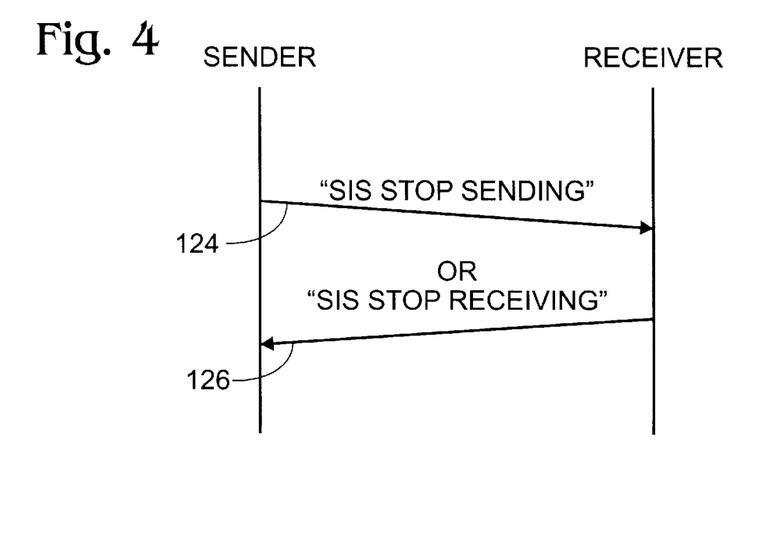

FIGS. 2–4 illustrate one embodiment of the still image communication protocol of the present invention. FIG. 2 illustrates a SIS set up subsession in further detail. To initiate a still image session, a sender (which may be either communication endpoint) transmits a "SIS camera busy" message packet 112 to the receiver (which is the other communication endpoint), notifying the receiver that a video input device supplying the video images for the video communication in progress has entered into a busy state. For the illustrated embodiment, no response from the receiver is required for message packet 112. Note that the sender may initiate the still image session in response to a request from the local participant or a request from the remote participant of the video communication.

After message packet 112, the sender transmits a "SIS set up" message packet 114 to the receiver, notifying the receiver to be prepared to receive a number of progressive scans of one or more still images from the sender. In response, the receiver transmits either a "SIS accept" or a "SIS reject" message packet back to the sender, notifying the sender of the receiver's acceptance or rejection of the still images.

FIG. 3 illustrates a SIS transfer subsession in further detail. Prior to providing the progressive scans of the still images to the receiver, the sender may optionally engage in a series of query and response dialogue 118 and 120 with the receiver. For example, the sender may want to ensure the receiver is still willing to accept more still images. Next, for the illustrated embodiment, the sender transmits a predetermined quantity of progressive scans 122 of a still image. In one embodiment, the sender transmits 15 progressive scans 122 of a still image over the same video channel.

FIG. 4 illustrates a SIS termination subsession in further detail. As shown, an SIS session may be terminated by either the sender or the receiver of the still images. In the sender case, the sender may terminate by sending a "SIS stop sending" message packet 124 to the receiver, whereas in the receiver case, the receiver may terminate by sending a "SIS stop receiving" message packet 126 to the sender.

Figure 5:
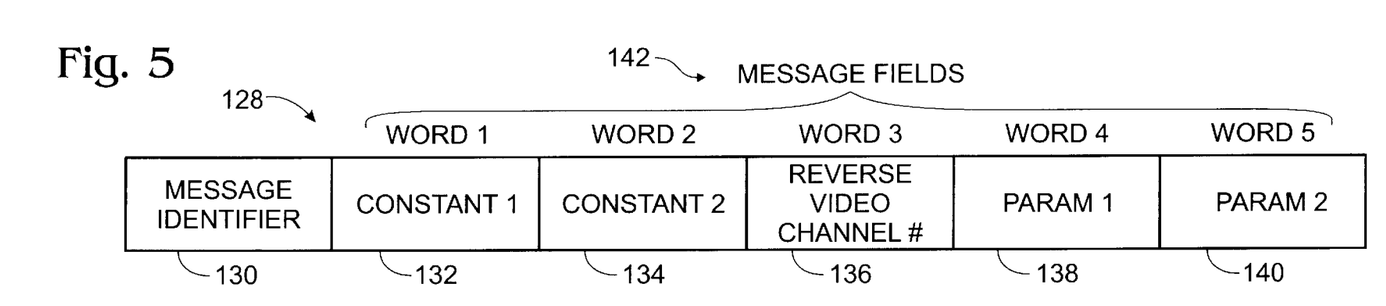
FIG. 5–7 illustrate one embodiment of the message packets for implementing the still image communication protocol of FIG. 2–4.
Figure 6:
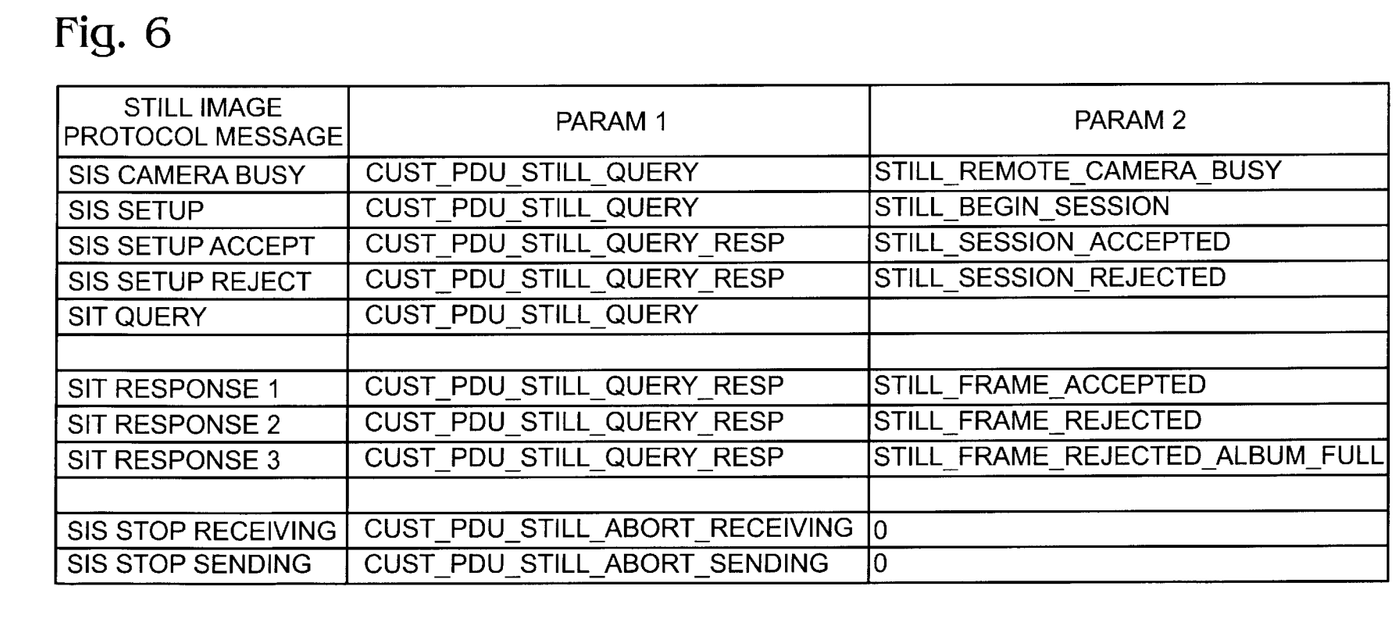
Figure 7:
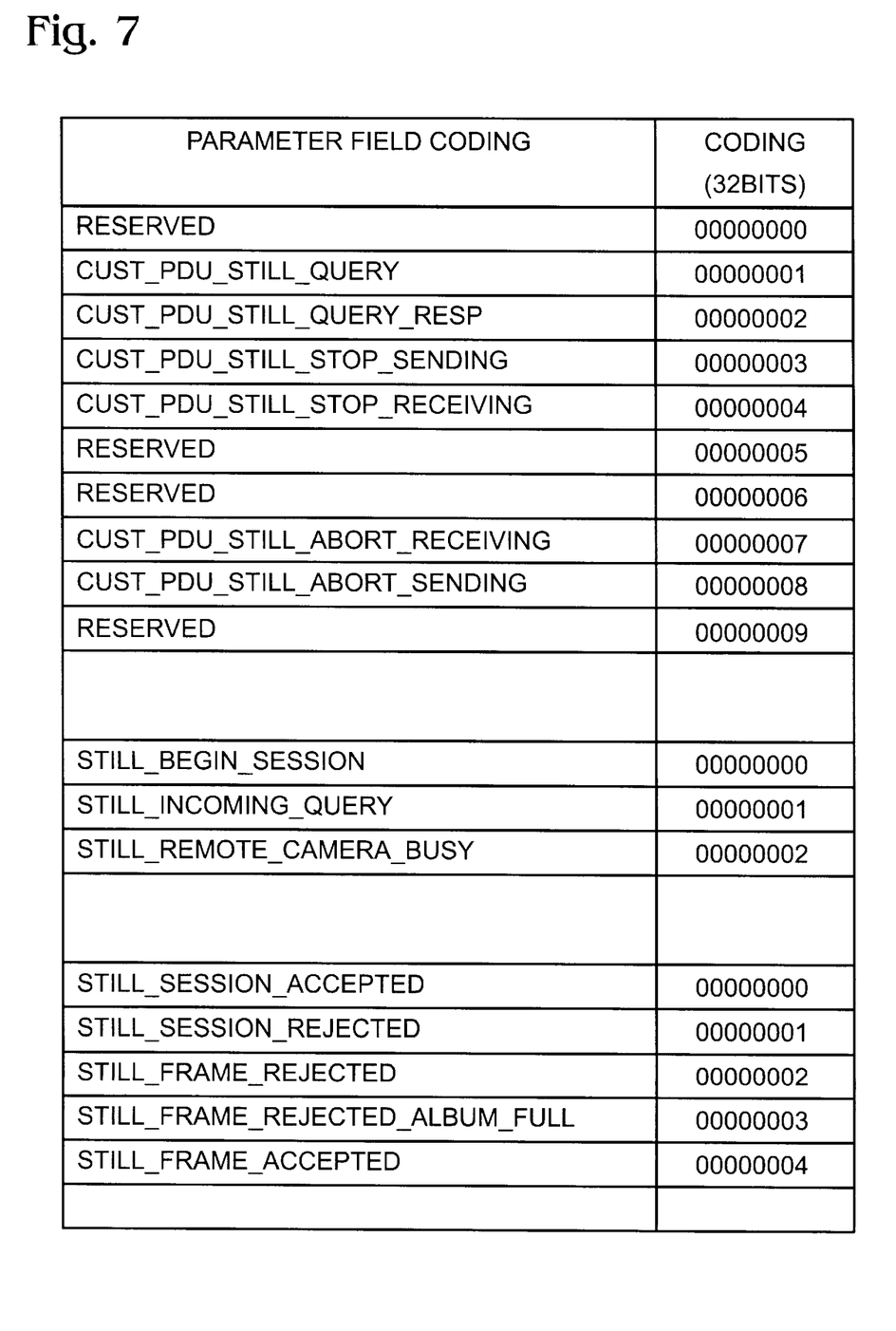

FIGS. 5–7 illustrate one embodiment of the message packets of the still image communication protocol. For the illustrated embodiment, each message packet 128 is a non-standard message packet in accordance with ITU-T's Recommendation H.245, entitled control protocol for multimedia communication, employed by H.324 video communications. Accordingly, each message packet 128 consists of two parts, non-standard identifier 130 and non-standard message fields 142. Non-standard identifier 130 identifies the organization that defines the extension to control protocol. For the illustrated embodiment, non-standard message fields 142 comprise five octet words, totaling 20 octets.

For the illustrated embodiment, octet words one and two 132 and 134 hold the constants "VIDEO_NONSTD_PDU" and "CUSTOM_PDU" respectively. Octet word three 136 holds a reverse video channel number (right justified). Octet words four and five 138 and 140 hold two parameter values. The parameter values vary depending on the nature of the message packet 128. The parameters by message packets are illustrated in FIG. 6 with the corresponding encoding illustrated in FIG. 7.

For example, for the "SIS camera busy" message packet, the value for parameter one is the encoding for "CUST_

PDU_STILL_QUERY", which is X"00000001", whereas the value for parameter two is the encoding for "STILL_REMOTE_CAMERA_BUSY", which is X"00000002". As a further example, for the "SIS setup accept" message packet, the value for parameter one is the encoding for "CUST_PDU_STILL_QUERY_RESP", which is X"00000002", whereas the value for parameter two is the encoding for "STILL_SESSION_ACCEPTED", which is X"00000000".

As will be appreciated by those skilled in the art, since H.245 control protocol is employed by H.324 video communications, the above described embodiment of the still image communication protocol is effectively defined within the video communication protocol.

Figure 8:
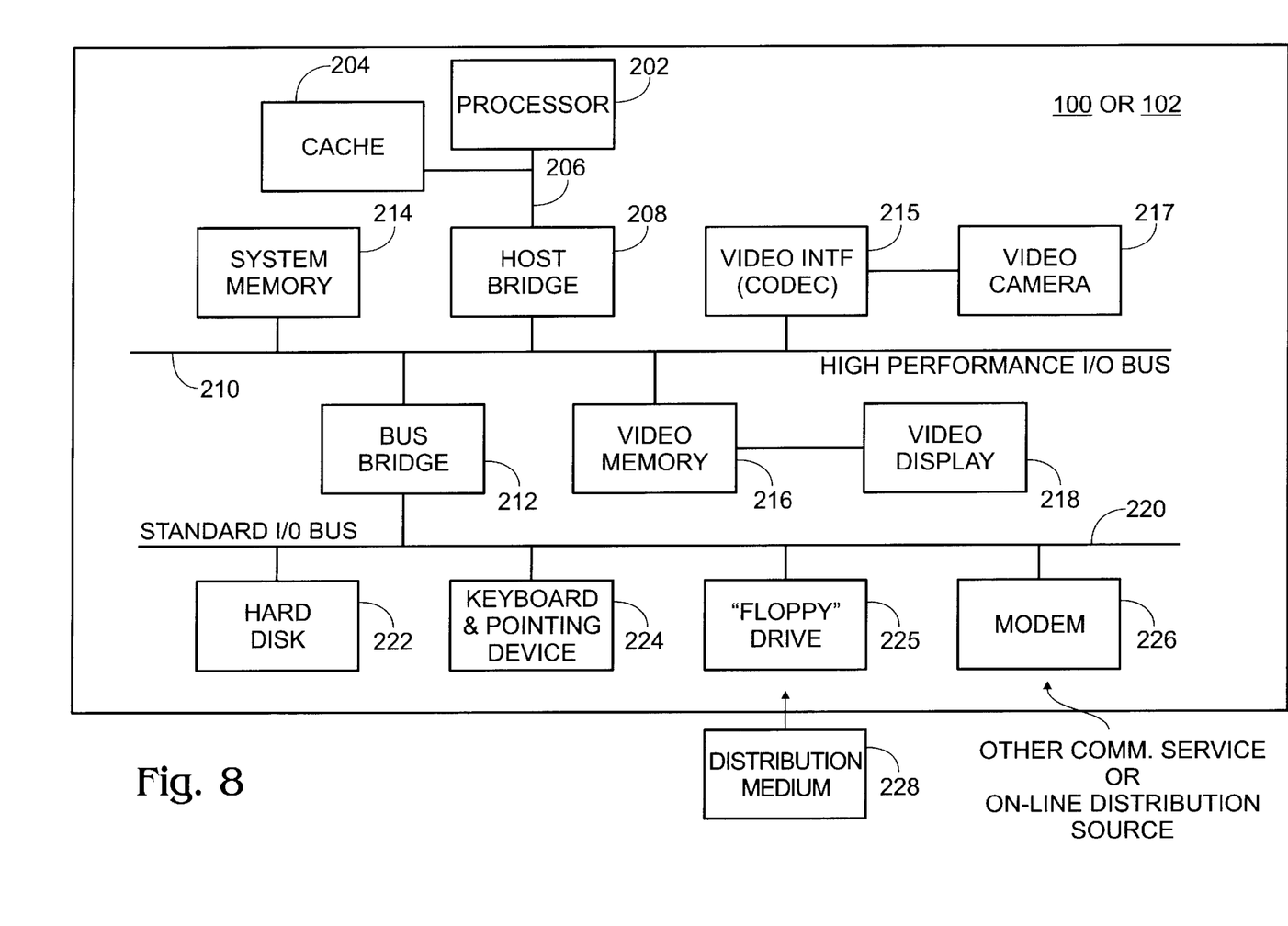
FIG. 8 illustrates a hardware view of one embodiment of the communication endpoints of FIG. 1.

FIG. 8 illustrates a hardware view of one embodiment of a video communication endpoint. For the illustrated embodiment, video communication endpoint 100 is a computer system equipped to conduct video communication by a user. As shown, for the illustrated embodiment, video communication endpoint 100 or 102 includes processor 202, processor bus 206, high performance I/O bus 210 and standard I/O bus 220. Processor bus 206 and high performance I/O bus 210 are bridged by host bridge 208, whereas I/O buses 210 and 212 are bridged by I/O bus bridge 212. Coupled to processor bus 206 is cache 204. Coupled to high performance I/O bus 210 are system memory 214, video interface 215 and video memory 216. Video interface 215 includes a video codec. Coupled to video memory 216 is video display 218, whereas coupled to video interface 215 is video camera 217. Coupled to standard I/O bus 220 are hard disk 222, keyboard and pointing device 224, floppy drive 225 and modem 226.

These elements perform their conventional functions known in the art. In particular, disk drive 222 and system memory 214 are used to store a permanent and a working copy of the programming instructions for effectuating the teachings of the present invention, when executed by processor 202. The permanent copy may be pre-loaded in factory, loaded from distribution medium 228 or downloaded from an on-line distribution source (not shown). The constitutions of these elements are known. Any one of a number of implementations of these elements known in the art may be used to form video communication endpoints 100 and 102.

Figures 9, 11:
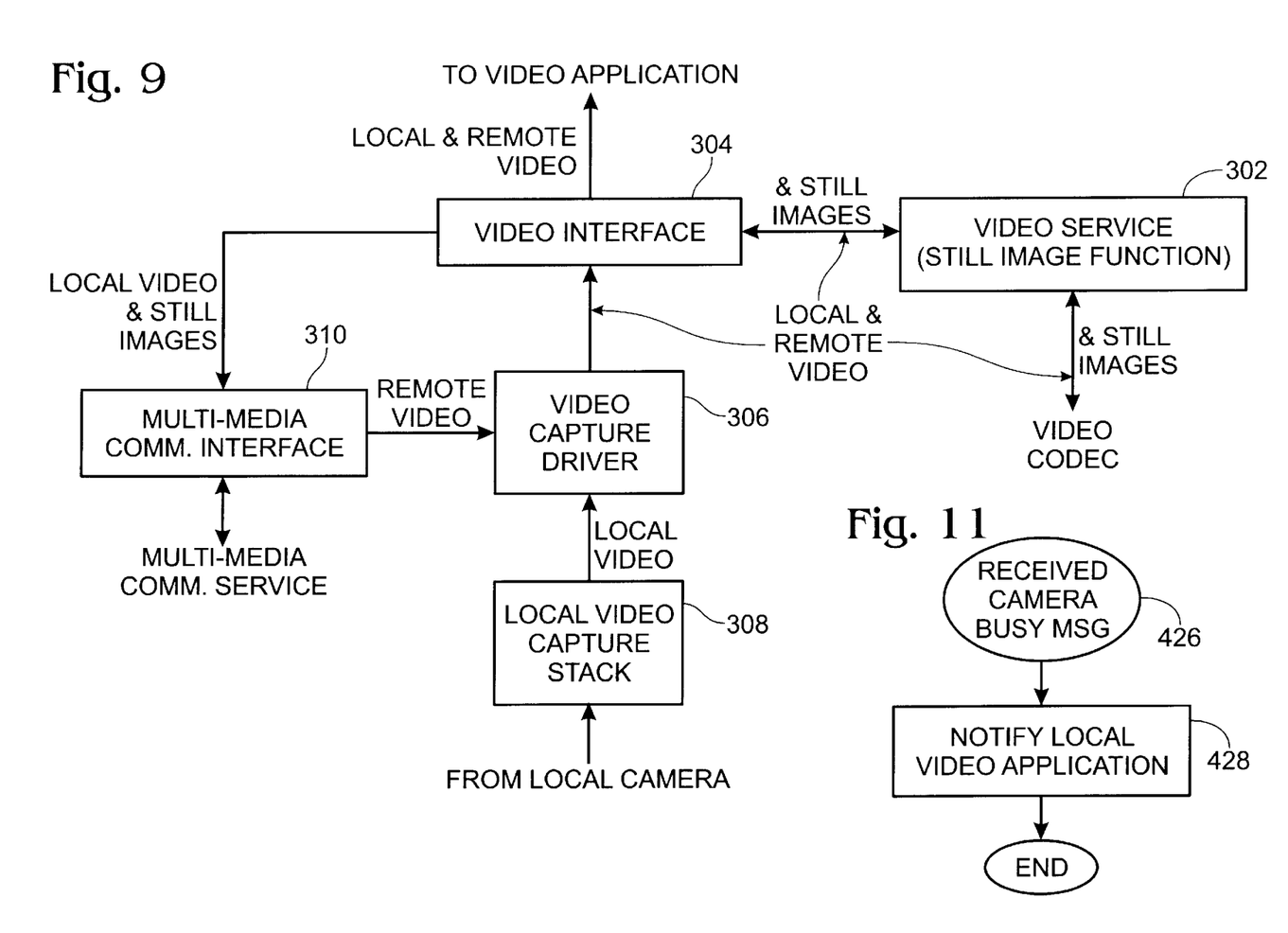
FIG. 9 illustrates a software view of selected components of one embodiment of the communication endpoints of FIG. 1.
FIGS. 10–12 illustrate the operational steps of one embodiment of the still image function of the video service of FIG. 9.

FIG. 9 illustrates a software view of selected components of one embodiment of video communication endpoint 100 or 102. As shown, the software elements includes video service 302 for facilitating video communication with the remote video communication endpoint, in accordance with a video communication protocol. Video service 302 includes a still image function with logic for providing a number of progressive scans of one or more still images in accordance with a still image communication protocol defined within the video communication protocol.

In addition to implementing the still image communication protocol as described above, for the illustrated embodiment, the still image function utilizes video codec (included in video interface 215) to generate the progressive scans for still image. For the illustrated embodiment, the still image function do so by holding constant the video image input provided to video codec. As a result, the successive video frames generated by the video codec become the progressive scans of the constant video image input, a still image. For the illustrated embodiment, the still image function also instructs video capture driver 306 switch from a rectangular format to a square format for capturing local video frames. In other words, for the illustrated embodiment, a rectangular frame format is used for video communication, whereas a square frame format is used for still image communication.

For the illustrated embodiment, video service 302 cooperates with other software elements on the system through video interface 304. In particular, the still image function notifies a video application, e.g. a videophone application, that video camera 217 has entered a busy state, through video interface 304. Similarly, the still image function cooperates with video capture driver 306 through video interface 304, and cooperates with a communication service (not shown) through video interface 304 and communication interface 310. The communication service is responsible for actually sending and receiving the message packets.

Any number of video capture drivers 306 and communication service known in the art may be used. Implementations of video and communication interfaces 304 and 310 are well within the ability of those skilled in the art. Accordingly, these elements will not be further described.

Figure 10:
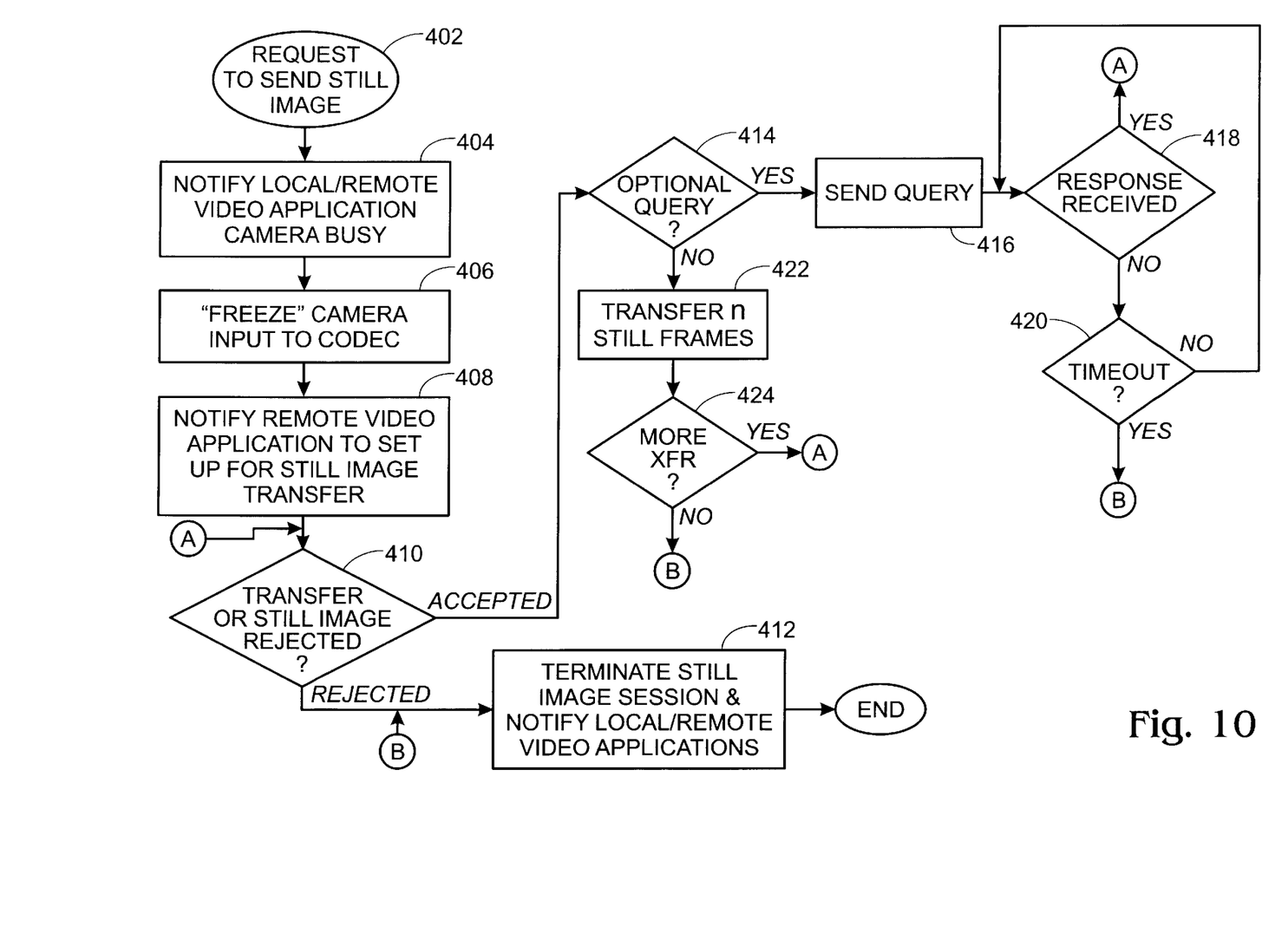
Figure 12:
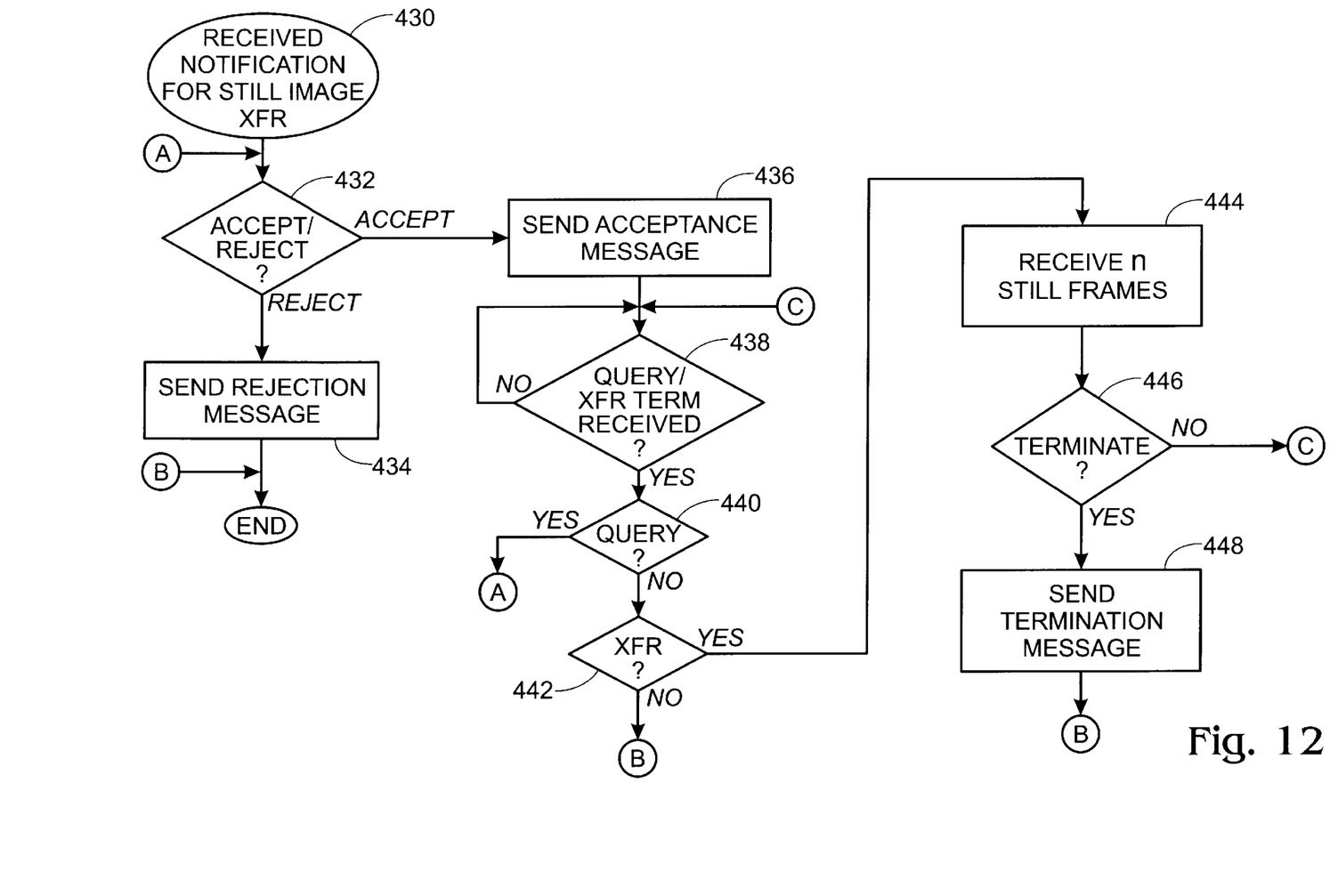

FIGS. 10–12 illustrate the operational steps of one embodiment of the still image function of the present invention. FIG. 10 illustrates the operational steps of the still image function in the role of a sender, whereas FIGS. 11–12 illustrate the operational steps of the still image function in the role of a receiver. All still image communications between the video communication endpoints described with references to these figures are conducted in accordance with a still image communication protocol defined within a video communication protocol as described above.

As shown in FIG. 10, upon receipt of a request to send one or more still image 404, for the illustrated embodiment, the still image function, in the role of a sender, notifies the remote video communication endpoint as well as the local video application that the video camera has entered a busy state, step 404. Upon making the notifications, the still image function holds constant the video image input provided to video codec to generate the progressive scans of a still image, step 406. In one embodiment, the still image function also instructs the video capture driver to switch to a square frame format in step 406. (The video capture driver was operating with a rectangular frame format for video communication.) Then, the still image function notifies the remote video communication endpoint to be prepared to receive the progressive scans of the still images, step 408.

If the remote video communication endpoint responded with a rejection notification, step 410, the still image function terminates the still image session, and resumes normal video communication, step 412. On the other hand, if the remote video communication endpoint responded with an acceptance notification, step 410, the still image function determines if it wants to perform an optional query of the remote video communication endpoint, step 414. Typically, the optional query is not performed for the first SIS transfer subsession.

If the still image function decided to perform an optional query, it sends the query message packet to the remote video communication endpoint, step 416, and then awaits for the reply, steps 418 and 420. The wait either results in the receipt of the anticipated reply or timeout. If no reply is received or if a reply is received, but the reply is a rejection notification, the still image function performs step 412 as described earlier. Otherwise, the still image function proceeds through the no branch of step 414 to step 422 and transfers a predetermined number of progressive scan of a still image to the remote endpoint.

After each SIS transfer subsession, the still image function determines if more still images are still to be transferred, step 424. If the determination is affirmative, the still image function proceeds to step 410 and repeat the process as described earlier. Otherwise, the still image function proceeds to step 412 and terminates the still image session.

As shown in FIG. 11, upon receipt of a notification that the remote video camera has entered a busy state, for the illustrated embodiment, the still image function, in the role of a receiver, notifies a local video application accordingly.

As shown in FIG. 12, upon receipt of a notification to be prepared to receive progressive scans of still images, for the illustrated embodiment, the still image function, in the role of a receiver, determines whether it is going to accept or reject the progressive scans, step 432. If the still image function determines to reject the progressive scans, it sends a rejection notification, step 434. On the other hand, if the still image function determines to accept the progressive scans, it sends an acceptance notification, step 436. In one embodiment, the still image function also notifies the local video capture driver to switch to a square frame format. (The local video capture driver was operating in a rectangular frame format for video communication.)

Upon sending the acceptance notification, the still image function awaits for either an optional query, a series of progress scan transfers or a termination message, step 438. If a query is received, the still image function returns to step 432 and proceeds as described earlier. If progressive scan transfers are received, the still image function receives the predetermined quantity of progressive scans of a still image, step 444. Upon receipt of the progressive scans, the still image function determines again whether it should terminate the receipt, step 446. If the determination is to continue, the still image function returns to step 438 and proceeds as described earlier. Otherwise the still image function sends a termination notification, and terminates the still image session, step 448. The still image function also terminates the still image session if it received a termination notification back at step 442.

While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

Thus various related methods and apparatuses for generating and providing still images have been described.

What is claimed is:

1. An apparatus comprising:
   (a) a storage medium having stored therein a plurality of programming instructions; and
   (b) an execution unit, coupled to the storage medium, to execute the plurality of programming instructions to implement a video service to facilitate full motion video communication with a remote apparatus through a full motion video communication connection established and operated in accordance with a full motion video communication protocol, the video service including a still image function to facilitate temporary suspension of full motion video transmission, and transmit instead a plurality of progressive scans of one or more still images through the same full motion video connection, in accordance with a still image communication protocol defined within said full motion video communication protocol.

2. The apparatus as set forth in claim 1, wherein said apparatus further comprises a local video application on whose behalf said video service facilitates said full motion video comrnmunication, and the still image function includes logic for notifying the local video application that a video input device supplying video images to the video service to provide on behalf of the local video application to the remote apparatus, has entered a busy state.

3. The apparatus as set forth in claim 1, wherein said apparatus further comprises a local video application on whose behalf said video service facilitates said full motion video communication, and the still image function includes logic for notifying the remote apparatus that a video input device supplying video images to the video service to provide to the remote apparatus on behalf of the local video application has entered a busy state, through the same full motion video communication connection and in accordance with said still image communication protocol defined within said full motion video communication protocol.

4. The apparatus as set forth in claim 1, wherein the still image function includes logic for notifying the remote apparatus to prepare to accept the plurality of progressive scans of said one or more still images, through the same full motion video communication connection and in accordance with said still image communication protocol defined within said full motion video communication protocol.

5. The apparatus as set forth in claim 1, wherein said apparatus further comprises a video capture driver for capturing video image frames in a first format for said video service to transmit to said remote apparatus at a full motion rate, and the still image function includes logic for instructing the video capture driver to switch to a second format of the still image function's choice for capturing said video image frames.

6. The apparatus as set forth in claim 1, wherein said apparatus further comprises a video codec for generating digital video image data to be framed for said video service to transmit to said remote apparatus at a full motion rate, and the still image function includes logic for holding constant video image input to the video codec to generate the plurality of progressive scans of a still image.

7. The apparatus as set forth in claim 1, wherein the still image function includes logic for querying the remote apparatus prior to providing the plurality of progressive scans of said one or more still images to the remote apparatus, through the same full motion video communication connection and in accordance with said still image communication protocol defined within said full motion video communication protocol.

8. The apparatus as set forth in claim 1, wherein the still image function includes logic for providing the plurality of progressive scans of said one or more still images to the remote apparatus, through the same full motion video communication connection and in accordance with said still image communication protocol defined within said video communication protocol.

9. The apparatus as set forth in claim 1, wherein the still image function includes logic for notifying the remote apparatus that provision of the plurality of progressive scans of said one or more still images to the remote apparatus is being terminated, through the same full motion video communication connection and in accordance with said still image communication protocol defined within said video communication protocol.

10. The apparatus as set forth in claim 1, wherein the apparatus is a computer system.

11. An apparatus comprising:
   (a) a storage medium having stored therein a plurality of programming instructions; and
   (b) an execution unit, coupled to the storage medium, to execute the plurality of programming instructions to provide a video service to facilitate full motion video communication with a remote apparatus through a full motion video communication connection and in accordance with a full motion video communication protocol, wherein the video service includes a still image function having logic to facilitate acceptance of a plurality of progressive scans of one or more still images from the remote apparatus, through the same full motion video communication connection and in accordance with a still image communication protocol defined within said full motion video communication protocol.

12. The apparatus as set forth in claim 11, wherein the still image function includes logic for responding to a notification from the remote apparatus to be prepared to accept the plurality of progressive scans of said one or more still images, through the same full motion video communication protocol and in accordance with said still image communication protocol defined within said full motion video communication protocol.

13. The apparatus as set forth in claim 11, wherein the apparatus further comprises a video capture driver for capturing remote video image frames in a first format and the still image function includes logic for instructing the video capture driver to switch to a second format of the still image function's choice for capturing remote video image frames.

14. The apparatus as set forth in claim 11, wherein the still image function includes logic for responding to a query from the remote apparatus, through the same full motion video communication connection and in accordance with said still image communication protocol defined within said full motion video communication protocol.

15. The apparatus as set forth in claim 11, wherein the still image function includes logic for notifying the remote apparatus to stop providing the plurality of progressive scans of said one or more still images, through the same full motion video communication connection and in accordance with said still image communication protocol defined within said full motion video communication protocol.

16. The apparatus as set forth in claim 11, wherein the apparatus is a computer system.

17. A machine implemented method comprising:
a) temporarily suspending full motion video communication with a remote machine, the full motion video communication being conducted over a full motion video communication connection established and operated in accordance with a full motion video communication protocol;
b) providing a plurality of progressive scans of one or more still images to the remote machine, through the same full motion video communication connection and in accordance with a still image communication protocol defined within the full motion video communication protocol; and
c) resuming the suspended full motion video communication with the remote machine through the same full motion video communication connection.

18. The method as set forth in claim 17, wherein (a) includes notifying a local video application that a video input device supplying video images to a video service to provide to the remote machine on behalf of the local video application has entered a busy state.

19. The method as set forth in claim 17, wherein (a) includes notifying the remote machine, through the same full motion video communication connection and in accordance with the still image communication protocol defined with the full motion video communication protocol, that a video input device supplying video images to a video service to provide to the remote machine on behalf of a local video application has entered a busy state.

20. The method as set forth in claim 17, wherein (a) includes notifying the remote machine, through the same full motion video communication connection and in accordance with the still image communication protocol defined with the full motion video communication protocol, to prepare to accept the plurality of progressive scans of said one or more still images.

21. The method as set forth in claim 17, wherein (b) includes instructing a video capture driver capturing video image frames in a first format for a video service to transmit to the remote apparatus at a full motion rate, to switch to a second format of the still image function's choice for capturing said video image frames.

22. The method as set forth in claim 17, wherein (b) includes holding constant video image input to a video codec to generate the plurality of progressive scans of a still image.

23. The method as set forth in claim 17, wherein (b) includes querying the remote machine, through the same full motion video communication connection and in accordance with the still image communication protocol defined with the full motion video communication protocol, prior to providing the plurality of progressive scans of said one or more still images to the remote machine.

24. The method as set forth in claim 23, wherein (b) further includes receiving a response from the remote machine, through the same full motion video communication connection and in accordance with said still image communication protocol defined within said full motion video communication protocol, as a result of said querying, and said provision of the progressive scans of said one or more still images to the remote machine is performed only if the remote machine indicates willingness to accept the progressive scans of said one or more still images.

25. The method as set forth in claim 17, wherein (b) includes receiving a response from the remote machine, through the same full motion video communication connection and in accordance with said still image communication protocol defined within said full motion video communication protocol, as a result of the performance of (a), and said provision of the progressive scans of said one or more still images to the remote machine is performed only if the remote machine indicates willingness to accept the progressive scans of said one or more still images.

26. The method as set forth in claim 17, wherein (b) is terminated if a termination notification is received from the remote machine, through the same full motion video communication connection and in accordance with said still image communication protocol defined within said full motion video communication protocol.

27. The method as set forth in claim 17, wherein (c) includes notifying the remote machine, through the same full motion video communication connection and in accordance with the still image communication protocol defined with the full motion video communication protocol, that provision of the plurality of progressive scans of said one or more still images to the remote machine is being terminated.

28. A machine implemented method comprising:
a) responding to a notification from a remote machine to temporarily suspend full motion video communication, the full motion video communication being conducted through a full motion video communication connection established and operated in accordance with a full motion video communication protocol;

b) receiving a plurality of progressive scans of one or more still images from the remote machine, through the same full motion video communication connection and in accordance with a still image communication protocol defined within the full motion video communication protocol; and c) resuming the suspended full motion video communication with the remote machine through the same full motion video communication connection.

29. The method as set forth in claim 28, wherein (a) includes instructing a video capture driver capturing remote video image frames in a first format, to switch to a second format of the still image function's choice for capturing said remote video image frames.

30. The method as set forth in claim 28, wherein (b) includes responding to a query from the remote machine, through the same full motion video communication connection and in accordance with said still image communication protocol defined within said full motion video communication protocol.

31. The method as set forth in claim 28, wherein (c) includes notifying the remote machine, through the same full motion video communication connection and in accordance with the still image communication protocol defined with the full motion video communication protocol to stop providing the plurality of progressive scans of said one or more still images.

\* \* \* \* \*

UNITED STATES PATENT AND TRADEMARK OFFICE
CERTIFICATE OF CORRECTION

PATENT NO.  : 5,996,008
DATED       : November 30, 1999
INVENTOR(S) : Gardos et al.

It is certified that error appears in the above-identified patent and that said Letters Patent is hereby corrected as shown below:

Column 3,
Line 53, before "temporary", insert -- the --.

Signed and Sealed this

Twelfth Day of August, 2003

JAMES E. ROGAN
*Director of the United States Patent and Trademark Office*